(12) United States Patent
Currie et al.

(10) Patent No.: US 9,855,928 B2
(45) Date of Patent: Jan. 2, 2018

(54) PUSH ON AND PULL OFF SCHRADER AND PRESTA VALVE AIR FILLER PUMP HEAD

(71) Applicants: Clifford Currie, Encinitas, CA (US); Joseph Donoghue, Escondido, CA (US); Murray Learmonth, Escondido, CA (US); Shi-ze Liu, Taipei (TW)

(72) Inventors: Clifford Currie, Encinitas, CA (US); Joseph Donoghue, Escondido, CA (US); Murray Learmonth, Escondido, CA (US); Shi-ze Liu, Taipei (TW)

( * ) Notice: Subject to any disclaimer, the term of this patent is extended or adjusted under 35 U.S.C. 154(b) by 36 days.

(21) Appl. No.: 15/043,524

(22) Filed: Feb. 13, 2016

(65) Prior Publication Data

US 2016/0237995 A1 Aug. 18, 2016

Related U.S. Application Data

(60) Provisional application No. 62/116,691, filed on Feb. 16, 2015.

(51) Int. Cl.
*F16K 15/20* (2006.01)
*B60S 5/04* (2006.01)
*F04B 33/00* (2006.01)

(52) U.S. Cl.
CPC .............. *B60S 5/04* (2013.01); *F04B 33/005* (2013.01); *Y10T 137/3584* (2015.04); *Y10T 137/3724* (2015.04)

(58) Field of Classification Search
CPC .................... Y10T 137/3584; Y10T 137/3724
USPC ........................................... 152/415; 285/317
See application file for complete search history.

(56) References Cited

U.S. PATENT DOCUMENTS

| 2015/0053280 A1* | 2/2015 | Wang | F16L 37/28 137/231 |
| 2015/0316160 A1* | 11/2015 | Wang | F04B 33/005 141/383 |
| 2015/0330525 A1* | 11/2015 | Wang | F16K 15/20 137/231 |

FOREIGN PATENT DOCUMENTS

EP 690231 A1 * 1/1996 .............. F04B 33/00

* cited by examiner

*Primary Examiner* — R. K. Arundale
(74) *Attorney, Agent, or Firm* — Eric Hanscom (57) ABSTRACT

Push On and Pull Off Schrader and Presta Valve Air Filler Pump Head is disclosed. By using a simple sliding motion and a complete redesign on how the nozzle engages the valve, the invention takes into account the natural action of a hand performing the action where the fingers would naturally be especially in a tight space like that of one that could be encountered between spokes. The invention also takes advantage of dominant muscle groups in the hand and fingers to make the motion of valve engagement and disengagement easier.

20 Claims, 7 Drawing Sheets

PUSH ON AND PULL OFF SCHRADER AND PRESTA VALVE AIR FILLER PUMP HEAD

CROSS REFERENCE TO RELATED APPLICATIONS

This application claims priority from U.S. Provisional Application No. 62/116,691, entitled Push On and Pull Off Schrader and Presta Valve Air Filler Pump Head, with a filing date of Feb. 16, 2015, a copy of which is attached to this application and the contents of which are incorporated by reference.

STATEMENT REGARDING FEDERALLY SPONSORED RESEARCH OR DEVELOPMENT

This invention was not federally sponsored.

BACKGROUND OF THE INVENTION

Brief Summary

This invention relates to a new and improved bicycle pump head capable of being used on both Schrader (American Valve) and Presta (French Valve) styles of bicycle tire valves.

Field of the Invention

This invention relates to the general field of pump heads used to inflate bicycle tires, and more specifically, to a pump head that can be pushed on and pulled off a valve for either a Schrader or Presta Valve. By using a simple sliding motion and a complete redesign on how the nozzle engages the valve, the invention takes into account the natural action of a hand performing the action where the fingers would naturally be especially in a tight space like that of one that could be encountered between spokes. The invention also takes advantage of dominant muscle groups in the hand and fingers to make the motion of valve engagement and disengagement easier.

Problem Addressed

As bicycle riding has turned over the last several decades from a common pastime for mainly children into a serious sport for all ages, the problem of how to inflate a bicycle tire has remained one of the "Achilles' Heels" of the industry. For starters, there are two popular valves being used now: the Shrader, or American Valve, and the Presta, or French Valve. When a bike rider has a flat tire on a busy road, the current options are a) to carry along a large, heave and cumbersome foot pump, or b) to bend over and use the portable hand pump. Neither is a good option, and why would a rider spend thousands of dollars and a lightweight racing bike only to add an extra couple of pounds from a traditional foot pump? On the other hand, which the current portable hand pumps are lightweight, they require a user to bend over or kneel on the ground, which is both uncomfortable and unsafe, and the "pumper" presents a smaller visual image to an oncoming car and the "pumper" cannot see his/her surroundings very well.

While trying to air up a tire or tube that uses a Schrader (American Valve) or Presta (French Valve) style valve, current pneumatic pump heads are difficult to use and often require repositioning the head and using two hands to achieve a seal that does not leak air. The current small heads are also difficult for people to use that have limited use of their fingers due to medical problems, accidents, or other disabilities.

Current head systems often require excessive force on the lever or top tab to actuate the proper clamping force to achieve a tight seal. This can result in damage to the valve, stem, head, and injury to the user.

It should be noted that smaller wheels or wheels with spokes close together can make it challenging to use the current and most popular type of head due to the physical dimensions of the pump head, stem length, valve type, human hands, and spoke spacing.

Current means of engagement with a valve and a manual floor pump requires the repositioning of a tab or lever on top of a pump head, making it difficult to operate in some circumstances. Also, Achieving a 100% seal that can stay engaged over 100 pounds per square inch of air pressure can be difficult with the style of heads currently offered.

The current head solution on the market often requires more than one hand to operate adding additional steps to the process and increasing the risk of tipping the bike and pump over resulting in damage and injury. Thus there has existed a long-felt need for a bicycle pump that is compact, lightweight, works on both Shrader and Presta valves, and can be operated off any traditional bicycle pump.

The current invention provides just such a solution by using a simple sliding motion and a complete redesign on how the nozzle engages the valve, the invention takes into account the natural action of a hand performing the action where the fingers would naturally be especially in a tight space like that of one that could be encountered between spokes. The invention also takes advantage of dominant muscle groups in the hand and fingers to make the motion of valve engagement and disengagement easier.

SUMMARY OF THE INVENTION

Selected embodiments of the current disclosure provide for a pump head comprising a thumb press, a collet guide, a center mounted fastener screw, a plurality of side mounted fastener screws, a collet ring, a pressure fitting, and a spring; where the collet guide has a top portion, an opposing bottom portion, and a length; where the thumb press is fastened to the top portion of the collet guide using the center mounted screw and the plurality of side mounted fastener screws; where the collet ring slides over the collet guide, and where the collet ring slides along the length of the collet guide; where the spring is around the collet guide, and where the spring provides a force to separate the thumb press and the collet ring; and where the pressure fitting resides within the collet guide. The pressure fitting comprises a rubber material. The collet guide is tapered. The spring has a diameter, where the collet guide has a diameter, and where the diameter of the spring is greater than the diameter of the collet guide. The collet ring has an external diameter and an internal diameter, where the external diameter of the collet ring is greater than the diameter of the spring; and where the internal diameter of the collet ring is less than the diameter of the spring. The collet ring consists of a material selected from the group consisting of stainless steel, aluminum, or plastic. The pressure fitting comprises internal barbs.

Further embodiments of the current disclosure provide for a method for inflating a sealed body comprising the steps of: grasping a pump head by placing a thumb on a thumb press and two fingers on a sliding collet ring, where the pump head comprises the thumb press, a collet guide, the collet ring, a pressure fitting, and a spring, where the collet ring slides over the collet guide, where the collet ring slides along the length of the collet guide, where the spring is around the collet guide, where the spring provides a force to separate the thumb press and the collet ring, and where the pressure fitting resides within the collet guide; squeezing the collet ring towards the thumb press thereby causing the collet ring to slide along the collet guide and the spring to compress; placing the pump head over a valve of the sealed body; and releasing the collet ring thereby causing the spring to decompress and the collet ring to slide along the collet guide to secure the pump head to the valve. The method further comprises inflating the sealed body through the pump head. The method further comprises, after inflating the sealed body, squeezing the collet ring towards the thumb press to release the valve from the pump head; removing the valve from the pump head; and releasing the collet ring.

Additional embodiments of the current disclosure provide for a pump head comprising a thumb press, a collet guide, a center mounted fastener screw, a plurality of side mounted fastener screws, a collet ring, and a pressure fitting; where the collet guide has a top portion, an opposing bottom portion, and a length; where the thumb press is fastened to the top portion of the collet guide using the center mounted screw and the plurality of side mounted fastener screws; where the collet ring slides over the collet guide, and where the collet ring slides along the length of the collet guide; and where the pressure fitting resides within the collet guide. The collet guide comprises a channel, wherein the collet ring comprises a channel, where the channel of the collet guide mates with the channel of the collet ring.

OBJECTS OF THE INVENTION

It is therefore an object of the present invention to provide a bicycle pump head that works on both Shrader and Presta valves.

It is another object of the invention to provide a bicycle pump head that is compact and lightweight.

It is a further object of the invention to provide a bicycle pump head that is easy to attach and remove.

Another object of the invention is to provide a bicycle pump head that can be retrofitted to a variety of different bicycle pumps.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

GENERAL DESCRIPTION OF THE FUNCTION OF THE INVENTION

As stated above, while trying to air up a tire or tube that uses a Schrader (American Valve) or Presta (French Valve) style valve, current pneumatic pump heads are difficult to use and often require repositioning the head and using two hands to achieve a seal that does not leak air. The current small heads are also difficult for people to use that have limited use of their fingers due to medical problems, accidents, or other disabilities.

Current head systems often require excessive force on the lever or top tab to actuate the proper clamping force to achieve a tight seal. This can result in damage to the valve, stem, head, and injury to the user.

It should be noted that smaller wheels or wheels with spokes close together can make it challenging to use the current and most popular type of head due to the physical dimensions of the pump head, stem length, valve type, human hands, and spoke spacing. The invention claimed here solves this problem.

This Schrader and Presta valve pneumatic pump head makes engagement with the Schrader or Presta valve easier by using a collet that slides easily up and down a guide following a natural hand motion. The head also creates a better leak proof fit by adding more surface area to the contact area between the head and the valve. The invention can be placed on and removed from a Schrader or Presta valve with one hand with relative ease.

Ease of use also contributes to decreased incidents of valve/stem damage and potential injury to the user.

The claimed invention differs from what currently exists. Using a simple spring or non-spring assisted collet and rubber grommet, this invention makes connecting to and sealing the interface between the Schrader or Presta type valve and head a simple sliding action. Other solutions require a rigid and difficult 90 degree up or down action of a lever that is often difficult to achieve in tight spaces or with limited use of hands or fingers.

Current head solutions often require two hands to use correctly and can be confusing to use if manufactured to accommodate both styles of valve (Presta and Schrader).

This invention is an improvement on what currently exists. Using a simple spring or non-spring assisted collet and rubber grommet, this invention makes connecting to and sealing the interface between the Schrader or Presta type valve and head a simple sliding action. Other solutions require a rigid and difficult 90 degree up or down action of a lever that is often difficult to achieve in tight spaces or with limited use of hands or fingers.

Current head solutions often require two hands to use correctly and can be confusing to use if manufactured to accommodate both styles of valve (Presta and Schrader).

Heads for manual floor pumps require a tight air seal and a leverage action to engage and disengage the head from the Schrader or Presta valve. Poor design, assembly, and manufacturing often result in the loss of air pressure, bent valves, valve stems, bruised knuckles, broken heads, and sore or pinched fingers when use of a common head is attempted.

By using a simple sliding motion and a complete redesign on how the nozzle engages the valve, the invention takes into account the natural action of a hand performing the action where the fingers would naturally be especially in a tight space like that of one that could be encountered between spokes. The invention also takes advantage of dominant muscle groups in the hand and fingers to make the motion of valve engagement and disengagement easier.

REFERENCE NUMBERS

1. Thumb Press
2. Tapered Collet Guide
3. Center mounted Fastener Screw
4. Side Mounted Fastener Screws
5. Sliding Collet Ring
6. Internal Rubber Pressure Fitting
7. Assisting Spring
8. Bicycle pump tube.
9. Bicycle tire valve.
10. Bicycle tire
11. Hose clamp
12. Barbed male connector Relationship Between the Components:

Thumb Press (1) is fastened to the Tapered Collet Guide (2) using both the center mounted (3) fastener screw and the side mounted fastener screws (4). Over the Tapered Collet Guide (3) is the assisting spring (7) which forces the sliding collet ring (5) down the collet guide (2) resulting in a clamping force exerted onto the tapered collet guide (2) and transferred internally to the Internal Rubber Pressure Fitting (6) creating a seal around a Schrader style or Presta Style air valve. The tapered collet guide and thumb press are preferable made from plastic, but can be made from nylon or a metal such as steel.

How the Invention Works:

A user grasps the pump head with one hand placing a thumb on the thumb press (1) and two fingers of their choosing on the sliding collet ring (5). When a squeezing action is applied, the collet ring (5) slides up the tapered collet guide (2) towards the Thumb Press (1) compressing the assisting spring (7) and allowing for the tapered collet guide (2) to reduce pressure on the internal rubber pressure fitting (6) allowing for the entire head assembly to fit onto either a Schrader or Presta style valve.

After the nozzle has been placed over a Schrader or Presta style valve, the collet ring (5) is released, forced down the tapered Collet Guide (2) by the assisting spring and with the assistance of the user's fingers (7) exerting pressure on the Internal rubber pressure fitting (6) and creating an air tight seal around the Schrader or Presta Valve.

How to Make the Invention:

The invention can be made by

Sourcing a peripheral seal for use around a Schrader or Presta valve to prevent air loss during pressurization.

The peripheral seal will be encased in a tapered collet guide tube that has been manufactured from high impact ABS plastic, PET, or HDPE using a custom mold to achieve the exacting standards to achieve optimal functionality.

An assisting spring will be custom wound and manufactured to be placed around the tapered collet guide to assist with the movement of the collet ring.

The collet ring is manufactured from either stainless steel, aluminum, or plastic.

Four small mounting screws will need to be sourced to an exacting fit to secure the tapered collet guide to the thumb press piece.

The thumb press piece is made from metal or plastic and is manufactured via C.N.C. if metal or via a custom mold if plastic.

The internal peripheral self-locking seal (Christmas tree like internal barbs) to allow maximum pressure of >100 P.S.I. As pressure increases, the locking force increases.

The invention will require mass production molded parts

The head will mate with standard tubing used on most commercially available bicycle floor pumps allowing for ease of use and interchangeability to existing pump systems.

To achieve functionality, all elements are except for the assisting spring are necessary.

The assisting spring may not be needed if the collet can be placed without the use of the assisting spring.

The collet and tapered collet guide can be modified by channeling (FIG. 7) both the tapered collet guide and the collet ring. A simple turn clockwise or counter clockwise of the collet ring would increase the seal pressure on a Schrader or Presta style valve.

The assisting spring on the invention may not be necessary (FIG. 4) to assist with getting leak proof fit if the collet can be slid into place without the use of the spring. The functionality of the unit will be identical without the spring. That functionality is to achieve a leak proof seal around the Schrader or Presta valve, allow for >100 P.S.I. air pressure and an easy 1 hand operation for the user.

Additionally, adding channels (FIG. 7) to both the tapered collet guide and the interior of the collet ring which can be rotated depending on the type of valve desired, can more efficiently engage a Schrader or Presta style valve securing a better leak proof seal and a head that is easier to place on a Presta or Schrader style valve and also remove.

Figure 5:
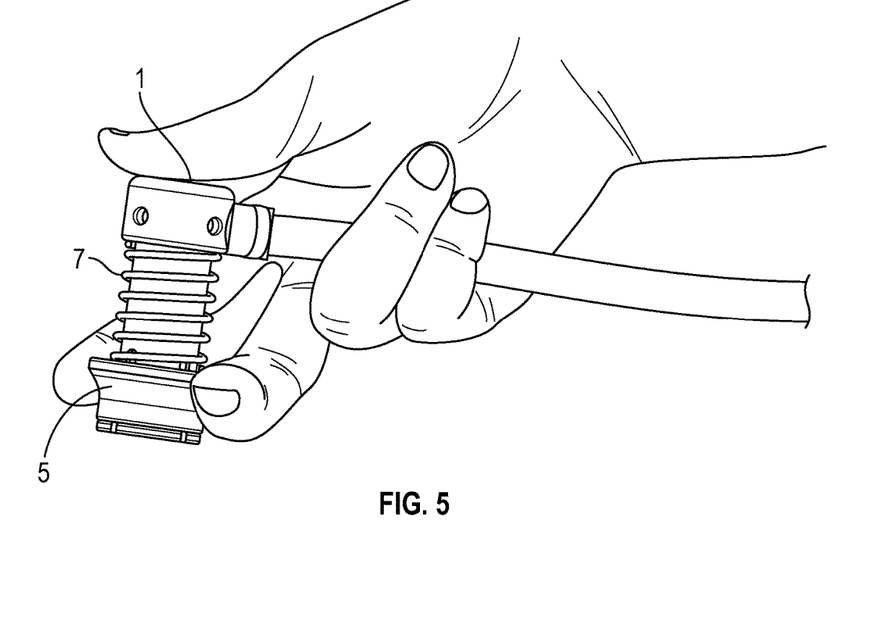
FIGS. 5 and 6 are perspective views of a user showing the proper location for a user's fingers on the invention.

How to Use the Invention:

To use the pump head device, one need simply place the pump head device in one hand, using two fingers on the sliding collet ring and one on the thumb press area to move the collet ring towards the thumb press (FIG. 5). The device is then placed over a Presta or Schrader air valve and then released. Two fingers can then be used to force the collet ring into place if it has not properly seated on its own.

To remove the device from a Presta or Schrader valve, the same squeezing motion is applied to the device again as it is lifted away from the Presta or Schrader valve. The pump head is then released and returns to a passive state.

If the invention is channeled, the same action is used to place the head on a Schrader or Presta valve. There will be a small clockwise or counter clockwise twist of the collet ring while in the up position to select either a Schrader or Presta valve adaptability.

DETAILED DESCRIPTION OF THE FIGURES

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

Figure 1:
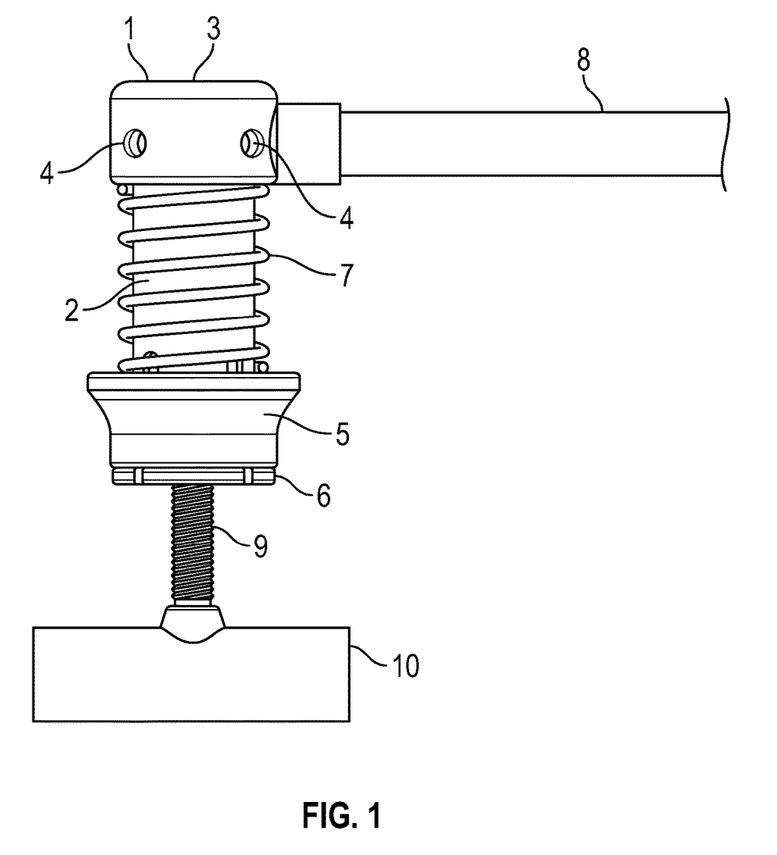
FIG. 1 is a side view of a bicycle pump head according to a preferred form of the invention.

FIG. 1 is a side view of a bicycle pump head according to a preferred form of the invention. The invention has a thumb press 1, where a user pushes down with his/her thumb, an assisting spring 7, encircling a tapered collet guide 2. Internal rubber pressure fittings 6 fit over the bicycle tire valve, and a sliding collet ring 5 then secures the invention over the bicycle tire valve. Side mounted fastener screws 4 keep the parts of the invention secured to each other in a horizontal manner, and a center mounted fastener screw 3 keeps the parts secured to each other in a vertical manner.

Figure 2:
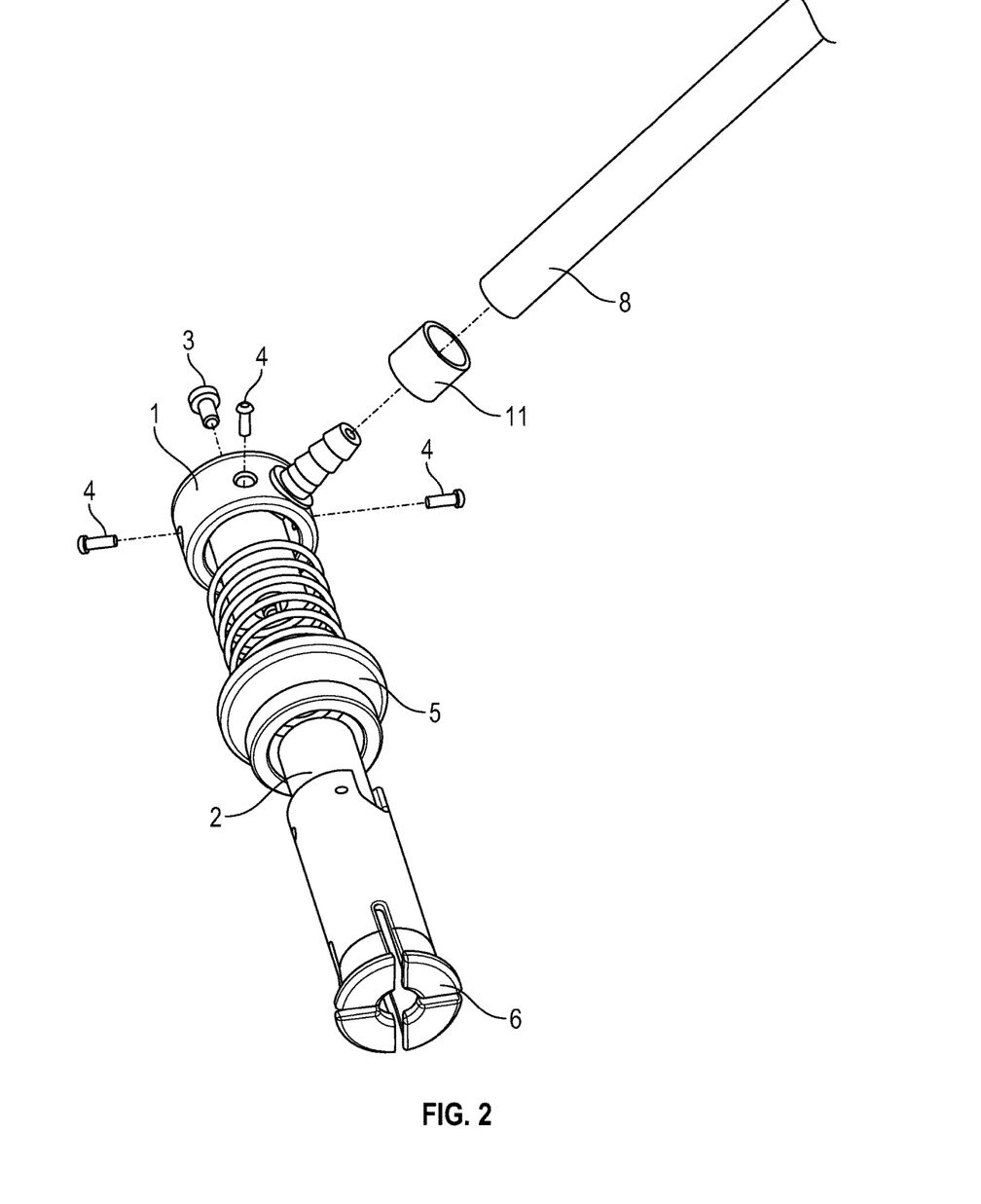
FIG. 2 is an exploded view of the invention.

FIG. 2 is an exploded view of the invention. This illustration shows how the invention can be retrofitted over a cut hose from an existing bicycle pump tube 8. A hose clamp 11 secures the bicycle pump tube 8 over the barbed male connector 12 of the invention. The tapered collect guide 2 can slide up and down inside the sliding collet ring 5.

Figure 3:
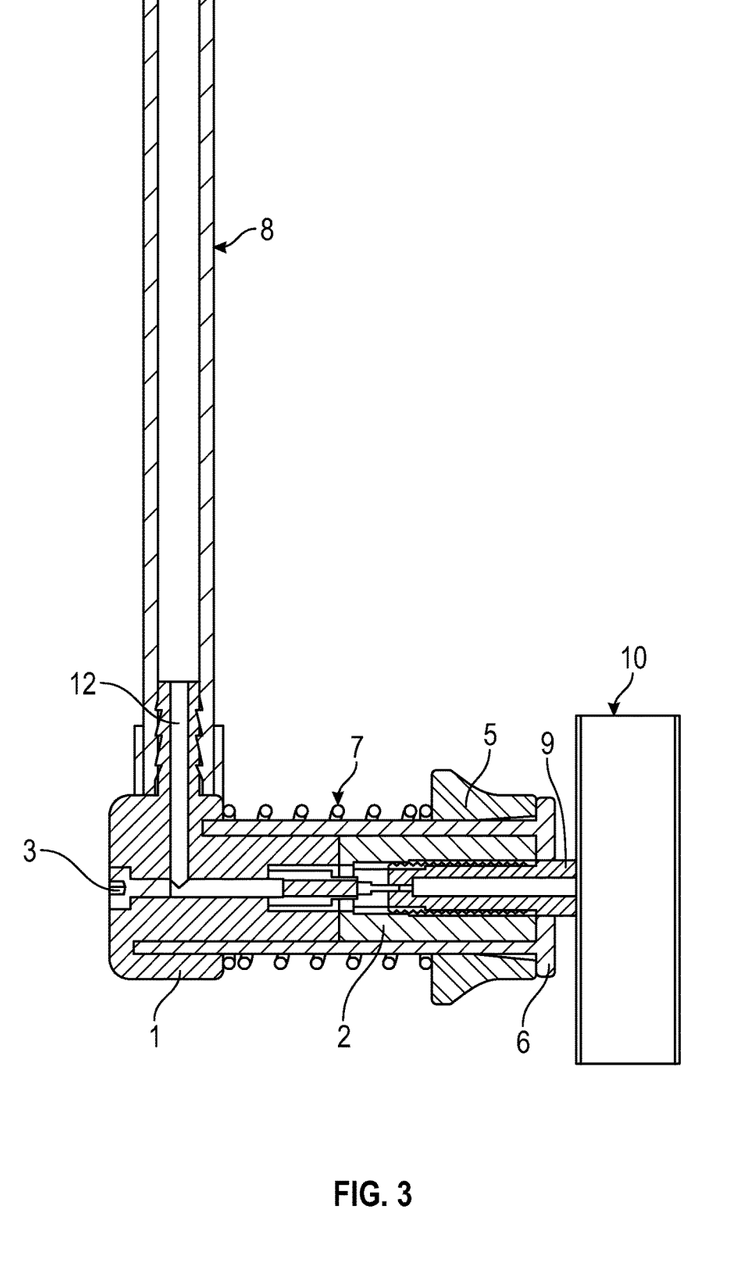
FIG. 3 is a cross sectional view of the invention engaging a valve.

FIG. 3 is a cross sectional view of the invention engaging a valve 9. The internal rubber pressure fitting 6 is secured around the valve as the sliding collet ring 5 presses in on the tapered collet guide 2.

Figure 4:
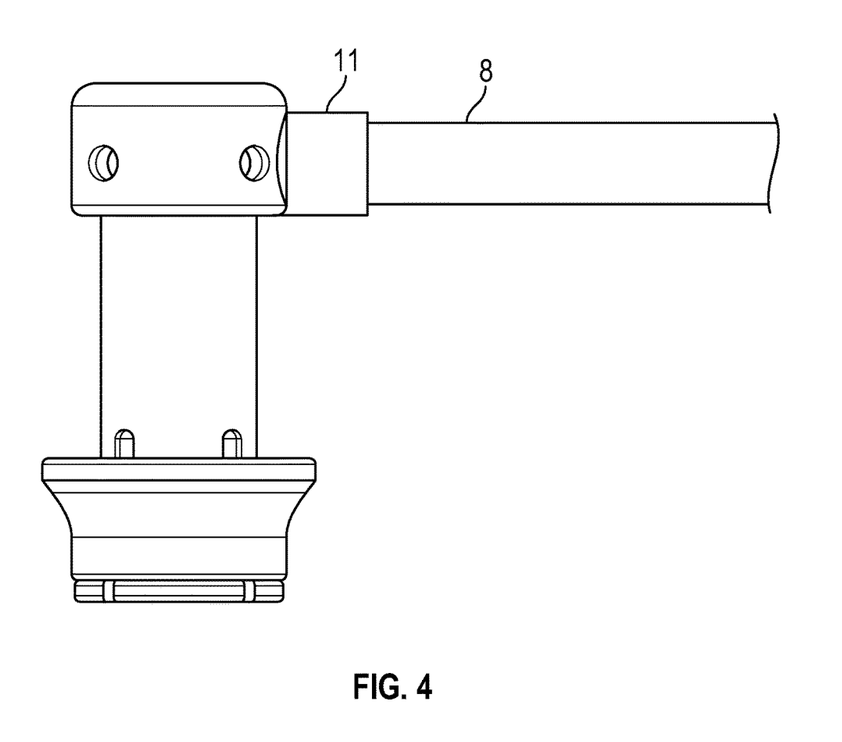
FIG. 4 is a side view of the invention.

FIG. 4 is a side view of the invention.

Figure 6:
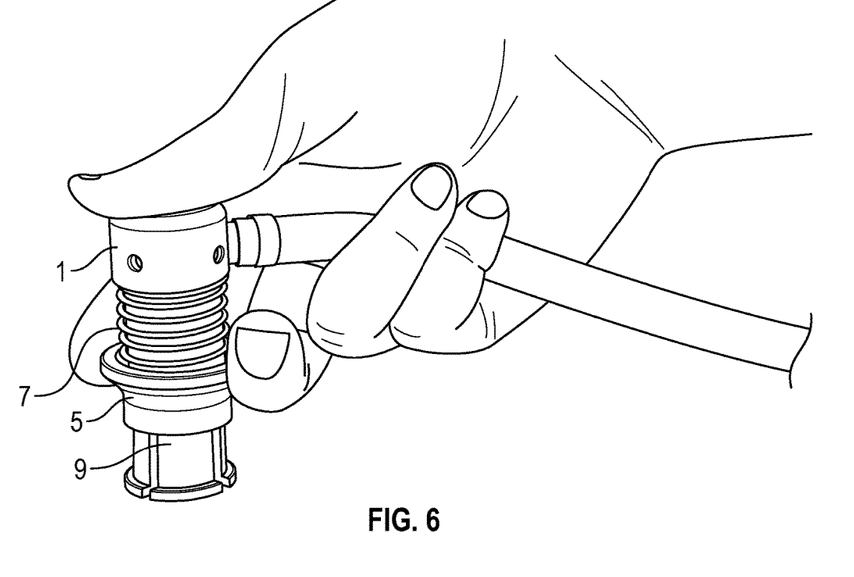

FIGS. 5 and 6 are perspective views of a user showing the proper location for a user's fingers on the invention. A user presses down on the thumb press 1, and pulls up on the sliding collet ring 5, compressing the assisting spring 7 to "open" the cavity in the invention. The invention is then slid over a bicycle tire valve 9 and the fingers release the sliding collet ring 5.

Figure 7:
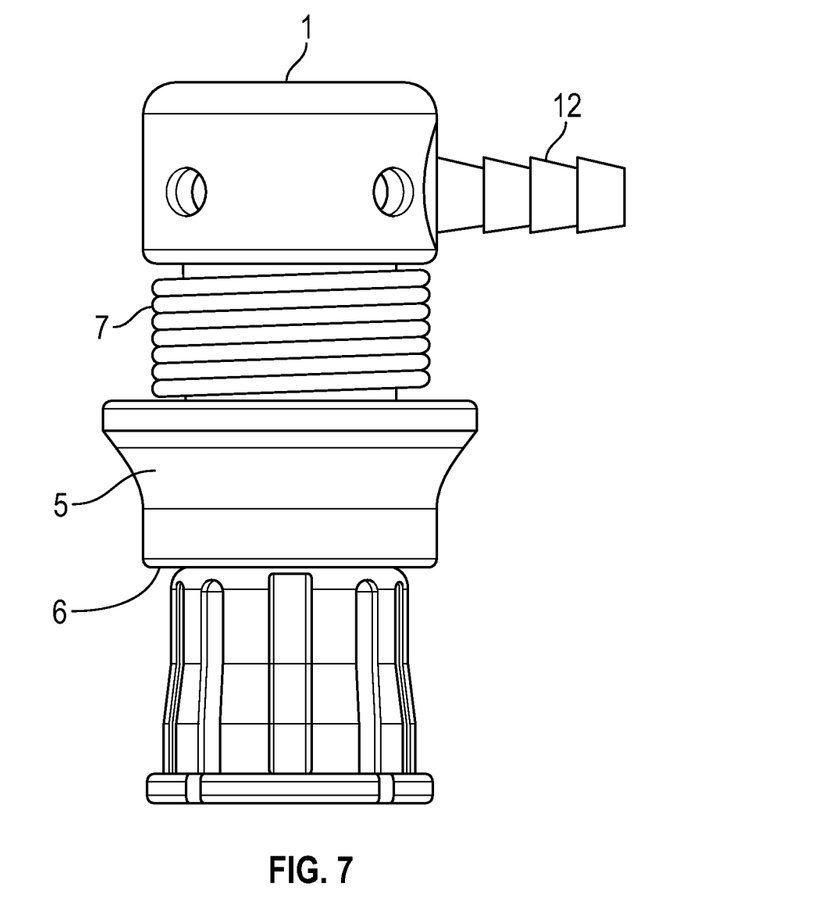
FIG. 7 is a side view of the invention with the spring compressed.

FIG. 7 is a side view of the invention with the spring compressed.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed:

1. A pump head comprising a thumb press, a collet guide, a center mounted fastener screw, a plurality of side mounted fastener screws, a collet ring, a pressure fitting, and a spring;
    where the collet guide has a top portion, an opposing bottom portion, and a length; where the thumb press is fastened to the top portion of the collet guide using the center mounted screw and the plurality of side mounted fastener screws;
    where the collet ring slides over the collet guide, and where the collet ring slides along the length of the collet guide;
    where the spring is around the collet guide, and where the spring provides a force to separate the thumb press and the collet ring; and
    where the pressure fitting resides within the collet guide.

2. The pump head of claim 1, wherein the pressure fitting comprises a rubber material.

3. The pump head of claim 1, wherein the collet guide is tapered.

4. The pump head of claim 1, wherein the spring has a diameter, where the collet guide has a diameter, and where the diameter of the spring is greater than the diameter of the collet guide.

5. The pump head of claim 4, wherein the collet ring has an external diameter and an internal diameter, where the external diameter of the collet ring is greater than the diameter of the spring; and where the internal diameter of the collet ring is less than the diameter of the spring.

6. The pump head of claim 1, wherein the collet ring consists of a material selected from the group consisting of stainless steel, aluminum, or plastic.

7. The pump head of claim 1, wherein the pressure fitting comprises internal barbs.

8. A method for inflating a sealed body comprising the steps of:
    grasping a pump head by placing a thumb on a thumb press and two fingers on a sliding collet ring, where the pump head comprises the thumb press, a collet guide, the collet ring, a pressure fitting, and a spring, where the collet ring slides over the collet guide, where the collet ring slides along the length of the collet guide, where the spring is around the collet guide, where the spring provides a force to separate the thumb press and the collet ring, and where the pressure fitting resides within the collet guide;
    squeezing the collet ring towards the thumb press thereby causing the collet ring to slide along the collet guide and the spring to compress;
    placing the pump head over a valve of the sealed body; and
    releasing the collet ring thereby causing the spring to decompress and the collet ring to slide along the collet guide to secure the pump head to the valve.

9. The method of claim 8, further comprising the step of inflating the sealed body through the pump head.

10. The method of claim 9, further comprising the steps of:
    after inflating the sealed body, squeezing the collet ring towards the thumb press to release the valve from the pump head;
    removing the valve from the pump head; and
    releasing the collet ring.

11. The method of claim 8, wherein the pressure fitting of the pump head comprises a rubber material.

12. The method of claim 8, wherein the collet guide of the pump head is tapered.

13. The method of claim 8, wherein the spring of the pump head has a diameter, where the collet guide of the pump head has a diameter, and where the diameter of the spring is greater than the diameter of the collet guide.

14. The method of claim 13, wherein the collet ring of the pump head has an external diameter and an internal diameter, where the external diameter of the collet ring is greater than the diameter of the spring; and where the internal diameter of the collet ring is less than the diameter of the spring.

15. The method of claim 8, wherein the pressure fitting of the pump head comprises internal barbs.

16. A pump head comprising a thumb press, a collet guide, a center mounted fastener screw, a plurality of side mounted fastener screws, a collet ring, and a pressure fitting;
    where the collet guide has a top portion, an opposing bottom portion, and a length; where the thumb press is fastened to the top portion of the collet guide using the center mounted screw and the plurality of side mounted fastener screws;

where the collet ring slides over the collet guide, and where the collet ring slides along the length of the collet guide; and where the pressure fitting resides within the collet guide.

17. The pump head of claim 16, wherein the pressure fitting comprises a rubber material.

18. The pump head of claim 16, wherein the collet guide is tapered.

19. The pump head of claim 16, wherein the collet guide comprises a channel, wherein the collet ring comprises a channel, where the channel of the collet guide mates with the channel of the collet ring.

20. The pump head of claim 16, wherein the pressure fitting comprises internal barbs.

* * * * *